United States Patent Office 3,325,447
Patented June 13, 1967

3,325,447
FLUOROELASTOMERS STABILIZED WITH BISULPHITES
Miles F. Kasparik, Montague, Mich., assignor to E. I. du Pont de Nemours and Company, Wilmington, Del., a corporation of Delaware
No Drawing. Filed Sept. 27, 1963, Ser. No. 312,004
3 Claims. (Cl. 260—45.9)

This invention relates to elastomeric copolymers of vinylidene fluoride and hexafluoropropene, and optionally, tetrafluoroethylene which exhibit improved color stability during exposure to temperatures above about 70° C. and to a process for the preparation of these copolymers.

Elastomeric copolymers of vinylidene fluoride and hexafluoropropene, or of vinylidene fluoride, hexafluoropropene, and tetrafluoroethylene have a tendency to discolor when exposed to temperatures of 70° C. and higher. This creates a problem during the manufacture of these copolymers when they are dried and during subsequent processing and use when the copolymers are exposed to elevated temperatures.

It is therefore an object of the present invention to provide copolymers of vinylidene fluoride and hexafluoropropene, and optionally, tetrafluoroethylene having improved stability against discoloration at elevated temperatures, particularly between 70 to about 110° C., and to provide a process for obtaining said copolymers having this improved characteristic.

Another object of the present invention is to provide a color stabilizing compound for fluoroelastomers consisting of vinylidene fluoride and hexafluoropropene, and optionally, tetrafluoroethylene. Other objects will appear hereinafter.

These and other objects of the present invention are accomplished by incorporating a color stabilizing amount of a compound selected from the group consisting of sodium bisulfite and ammonium bisulfite into the fluoroelastomer described. The resultant copolymer exhibits improved color stability particularly at temperatures above 70° C.

The preferred fluoroelastomers stabilized in accordance with this invention are of the following types:

(a) Copolymers consisting of, by weight, 70–30 percent of vinylidene fluoride units and 30–70 percent of hexafluoropropene units. These copolymers and their preparation are described in U.S. Patent 3,051,677.

(b) Copolymers consisting of, by weight, 3 to 35 percent of tetrafluoroethylene units and 97 to 65 percent of vinylidene fluoride and hexafluoropropene units, the vinylidene fluoride and hexafluoropropene units being present in a weight ratio within the range of 2.33:1 to 0.667:1.0. These copolymers and their preparation are described in U.S. Patents 2,968,649 and 3,039,992.

These copolymers are usually isolated in a particulate, crumb-like form, either by chemical coagulation from an emulsion or by a centrifuging process. These particles or "crumbs" of copolymer are white in color at the time of their isolation. In practicing this invention, the bisulfite stabilizing agent is added to the copolymer crumbs by milling or by any other standard mixing technique. It is usually more convenient to add the bisulfite as an aqueous solution, although the solid salt may be added, if desired.

While small amounts of ammonium bisulfite or sodium bisulfite may have been included in the catalyst system used for the polymerization of the subject copolymers, the bisulfite remained behind in the aqueous phase of the polymerization system or was washed out of the copolymer during the washing step. It was therefore unexpected that the addition of these salts to the isolated copolymer, i.e., after washing, would produce a copolymer having improved stability toward discoloration during subsequent processing and exposure to elevated temperatures. While there is normally some variation in tendency to discolor among different batches of fluoroelastomer, the bisulfite added according to the present invention invariably has a beneficial effect on color stability. The isolated copolymer to which the color stabilizing bisulfite is added is that copolymer which has been separated from its polymerization medium and has been subsequently washed.

It has been found that as little as 0.025 part of the bisulfite will produce a significant improvement in color stability of the fluoroelastomer, both during milling and on subsequent exposure to high temperatures. More than 2 parts of the salt is not required. The preferred amounts range from about 0.1 to 0.5 part. All these "parts" are by weight based on 100 parts by weight of fluoroelastomer. A color stabilizing amount of the bisulfite compound is that amount which imparts the desired degree of color stability to the fluoroelastomers and therefore will depend on such factors as the particular sample of fluoroelastomer and on the high temperature conditions to which the selected fluoroelastomer will be exposed.

The stabilized fluoroelastomers may be compounded and cured by any of the conventional techniques used with fluoroelastomers of this type. The tensile properties of the vulcanizates are not adversely affected by the presence in the elastomer of sodium bisulfite or ammonium bisulfite.

The following examples are illustrative of the present invention. Parts and percents are by weight unless otherwise indicated.

The fluoroelastomers used in these examples are made as follows:

FLUOROELASTOMER A

This is a copolymer containing, by weight, 60 percent of vinylidene fluoride units and 40 percent of hexafluoropropene units. It is prepared essentially as described in Example 11 of U.S. Patent 3,051,677 except that the catalyst solution does not contain disodium hydrogen phosphate and ammonium perfluorooctanoate. The polymer, isolated by centrifuging, is in the form of white crumbs.

FLUOROELASTOMER B

This fluoroelastomer is a copolymer containing, by weight, 45 percent of vinylidene fluoride units, 30 percent of hexafluoropropene units, and 25 percent of tetrafluoroethylene units and is prepared essentially as described in U.S. Patent 3,039,992, columns 5–6. It is isolated by centrifuging and is in the form of white crumbs.

Example 1

Varying amounts of sodium bisulfite are incorporated into Fluoroelastomer A by the following method.

An aqueous solution (0.5–3%) of the sodium bisulfite is mixed with the elastomer crumbs and the mixture is dried in a vacuum oven at 70° C. The resulting composition is then milled on a standard rubber mill at 100–110° C. for 4 to 7 minutes. (The temperature, 100–110° C., is selected to facilitate the milling process.) After the milling, the color of the sample is compared visually with the color of the control which has been treated in the same way except that no sodium bisulfite has been added to the copolymer.

After milling, samples of the test compositions and the control composition are stored in an air oven maintained at 100° C. The color of the samples is observed after 16 hours. The results are shown in the following table.

| Parts of NaHSO₃ per 100 parts of fluoroelastomer | Color | |
|---|---|---|
| | After Milling | After storage at 100° C. for 16 hours |
| 0 | Light amber | Amber. |
| 0.25 | Light tan, much lighter than control. | Light Amber. |
| 1.5 | White | White. |

*Example 2*

This example is carried out in the same way as Example 1 except that ammonium bisulfite is used instead of sodium bisulfite. Results are shown in the following table.

| Parts of NH₄SO₃ per 100 parts of fluoroelastomer | Color | |
|---|---|---|
| | After Milling | After storage at 100° C. for 16 hours |
| 0 | Light amber | Amber. |
| 0.025 | Pale amber (lighter than control). | Light amber. |
| 0.25 | White | Very pale amber. |
| 0.75 | White | White. |

*Example 3*

In this example Fluoroelastomer B is used. Varying amounts of ammonium bisulfite are added as a water solution when the polymer is being milled. After milling at 100–110° C. until the polymer is dry, the control sample to which no ammonium bisulfite is added shows severe brown discoloration. Samples of fluoroelastomer containing 0.1, 0.2, 0.3, and 0.4 part, per 100 parts of copolymer, show only slight discoloration.

As many widely different embodiments of this invention may be made without departing from the spirit and scope thereof, it is to be understood that this invention is not limited to the specific embodiments thereof except as defined in the appended claims.

What is claimed is:
1. Isolated fluoroelastomer having incorporated therein a color stabilizing amount of a compound selected from the group consisting of sodium bisulfite and ammonium bisulfite, said fluoroelastomer being a copolymer selected from the group consisting of vinylidene fluoride/hexafluoropropene copolymers and vinylidene fluoride/hexafluoropropene/tetrafluoroethylene copolymers.
2. The isolated fluoroelastomer of claim 1 wherein the first mentioned copolymers consist essentially of 70–30% by weight of vinylidene fluoride units and 30–70% by weight of hexafluoropropene units and the second mentioned copolymers consist essentially of 3 to 35% by weight of tetrafluoroethylene units and 97 to 65% by weight of vinylidene fluoride and hexafluoropropene units, the vinylidene fluoride and hexafluoropropene units being present in a weight ratio within the range of 2.33:1 to 0.667:1.0.
3. The isolated fluoroelastomer of claim 1 wherein from about 0.025 to 2 parts by weight of said compound is present in 100 parts by weight of said copolymer.

References Cited

UNITED STATES PATENTS

| 2,878,214 | 3/1959 | Holmes | 260—45.7 |
| 2,951,832 | 9/1960 | Moran | 260—45.9 |
| 2,960,486 | 11/1960 | Pye | 260—45.7 |
| 3,039,992 | 6/1962 | Smith | 260—87.7 |
| 3,053,778 | 9/1962 | Toone | 260—45.7 |
| 3,225,005 | 12/1965 | Asmus et al. | 260—45.7 |
| 3,247,150 | 4/1966 | Hahn et al. | 260—45.7 |

DONALD E. CZAJA, *Primary Examiner.*

LEON J. BERCOVITZ, H. E. TAYLOR,
*Assistant Examiners.*